United States Patent [19]

Sendall et al.

[11] Patent Number: 4,975,864

[45] Date of Patent: Dec. 4, 1990

[54] SCENE BASED NONUNIFORMITY COMPENSATION FOR STARTING FOCAL PLANE ARRAYS

[75] Inventors: Robert Sendall, Chatsworth; Donald K. Knight, Thousand Oaks; Marvin J. Ramirez, Moorpark; Raymond L. McKeefery, Thousand Oaks; Chuong D. Dan, Canoga Park, all of Calif.

[73] Assignee: Hughes Aircraft Company, Los Angeles, Calif.

[21] Appl. No.: 302,534

[22] Filed: Jan. 26, 1989

[51] Int. Cl.$^5$ .................................................. G01J 1/00
[52] U.S. Cl. ................................. 364/571.01; 382/50
[58] Field of Search ............ 364/570, 571.01, 571.04, 364/571.05, 571.07, 571.08, 572, 575, 582; 250/332; 382/50, 52, 54; 358/113

[56] References Cited

U.S. PATENT DOCUMENTS

| | | | |
|---|---|---|---|
| 4,736,439 | 4/1988 | May | 382/52 |
| 4,782,389 | 11/1988 | Mayweather, III | 382/54 |
| 4,783,840 | 11/1988 | Song | 382/54 |

Primary Examiner—Parshotam S. Lall
Assistant Examiner—Michael Zanelli
Attorney, Agent, or Firm—R. M. Heald; R. A. Hays; W. Denson-Low

[57] ABSTRACT

Apparatus and methods for providing nonuniformity compensation of staring infrared focal plane array imaging systems, or other video imaging ssytem, or the like. The invention comprises a processor which implements nonuniformity compensation of the detectors comprising the array. The processor generates compensation terms that are stored in an offset term memory and which are subsequently combined with the output signals from the array. The processing accomplished by the present invention normalizes all detector elements in the array such that they all appear to respond to infrared energy in an identical manner. The processor comprises a median filter which selectively implements cross (X) shaped and plus (+) shaped filters. An antimedian calculator computes the antimedian of the output of the median filter. This value comprises the difference between the central pixel of a respective filter and the median value of all pixels in the cross (X) or plus (+) shaped filter. A third filter samples each of the signals from the detector array and compares them to a preset value indicative of an anticipated scene intensity level determined by the operator to provide an output signal indicative of the difference. Control circuity selects which output signal of the filter circuits is to be used to compensate the detector signals during a particlar video field. The ouptut signals of the antimedian calculator and average filter comprise sign information which is indicative whether the central pixel value is less than, equal to or greater than the median, or whether the central pixel is less than, equal to or greater than the preset value, respectively. The control circuitry increments or decrements the value of the offset terms stored in the offset term memory in resonse to the signal provided by the selected antimedian calculator or third filter, and convergence rate information supplied by the control circuitry which controls the rate of convergence of the offset terms toward the scene average.

7 Claims, 7 Drawing Sheets

SCENE BASED NONUNIFORMITY COMPENSATION FOR STARTING FOCAL PLANE ARRAYS

BACKGROUND OF THE INVENTION

The present invention relates generally to video processing apparatus and methods for use with imaging systems and the like, and more particularly to a system and method which implements scene based nonuniformity compensation of the detector elements of a staring infrared focal plane array imaging system.

Nonuniformity compensation for staring infrared focal plane array imaging systems is generally necessary to adjust each of the detector elements so that their outputs will appear to be identical. Implementation of nonuniformity compensation results in low fixed pattern noise in the infrared image. Consequently, subsequent processing of the infrared image to determine targets or other scene information can operate at low signal to noise ratios and consequently long standoff ranges.

Conventional nonuniformity compensation methods have employed such techniques as storing compensation terms in memory or utilizing spiral scan techniques, for example. The memory storage technique involves viewing a uniform infrared source under laboratory conditions and storing the compensation terms in memory. This technique is far from efficient, since if the average temperature of the scene changes by a few degrees Celsius with respect to the temperature used to calibrate the compensation terms, then the compensation is not correct and a high fixed pattern noise imager will result. Spiral scanning techniques involve moving the detector line of sight in a spiral pattern to smear the image and provide a somewhat uniform scene on with the nonuniformity compensation can be made. However, one major disadvantage of this technique is that the seeker has to stop providing imagery to the tracker during the flight to perform this function. In addition, blockage of the image is required to provide a uniform input to the detector using a reference source. Alternatively, a shutter may be employed as a means of providing a uniform reference source on which compensation terms may be calculated. However, the shutter also blocks the image during the referencing procedure. Accordingly, these techniques have limitations which hamper their use in infrared imaging systems.

SUMMARY OF THE INVENTION

In order to overcome the limitations of conventional nonuniformity compensation techniques, the present invention provides for apparatus and methods for providing nonuniformity compensation of staring infrared focal plane array imaging system, or other video imaging system. The present invention does not require laboratory calibration, utilizes scene information to implement the compensation, is independent of scene temperature and provides compensation that does not require the line of sight of the imager to leave the target at any time during the flight.

In particular, the present invention provides a signal processor for use with a focal plane array infrared imaging system, or the like, and in particular a staring focal plane array infrared imaging system, which implements nonuniformity compensation of the detectors comprising the array. The present invention generates offset compensation terms that are stored in an offset term memory and which are subsequently combined with the output signals from the array. The processing accomplished by the present invention normalizes all detector elements in the array such that they all appear to respond to infrared energy in an identical manner.

The present invention comprises a median filter which selectively implements a plurality of filters, and in the specific embodiment disclosed herein, cross (X) shaped and plus (+) shaped filters. The median filter is coupled to an antimedian calculator which computes the antimedian of the selected output of the median filter. This value comprises the difference between the central pixel value of a particular filter and the median value of all pixels in the cross (X) or plus (+) shaped filter. A normalization filter comprising a comparator circuit is employed in parallel with the median/antimedian circuitry to sample each signal from the detector array, comparing its value to a preset value indicative of an expected scene intensity level determined by the operator. The output signals of the antimedian calculator and average filter comprise sign information which is indicative whether the central pixel value is less than, equal to or greater than the median, or whether each individual signal is less than, equal to or greater than the preset value, as the case may be.

Control circuitry is provided that is coupled to the median filter, the antimedian calculator and the average filter, that selects which of the circuits is to be used to filter the detector signals during a particular video field. The control circuitry is coupled to increment/decrement circuitry which is employed to increment or decrement the value of the offset term stored in the offset term memory in response to the signal provided by the selected filter, and a convergence rate supplied by the control circuitry. Thus, the controller controls the circuitry used to filter the detector signals and the rate of convergence of the offset terms toward the scene average.

More particularly, the median filter portion of the present invention comprises a plurality of registers for sampling a matrix of output signals from the array, generally centered around a central signal or pixel which corresponds to the particular detector element being compensated. In the disclosed embodiment, a 3×3 array of registers is used. A set of multiplexers is coupled to selected ones of the plurality of registers for sampling signals from the matrix having the shape of a cross (X) and the shape of a plus (+). The control circuit has selection lines coupled to the set of multiplexers which controls which filter is implemented during any particular video field. A comparator arrangement and lookup table is coupled to the set of multiplexers which determines the median value of the signals comprising the cross (X) or plus (+) shaped filter. Output signals from the set of multiplexers are also coupled to a second multiplexer which selects the median value from the signals comprising the cross (X) or plus (+) shaped filter in response to a selection signal provided by the lookup table.

In operation, the controller selects which filter shape is to be employed to filter the detector signals during each video field. The controller can select the cross (X) shaped filter, the plus (+) shaped filter, the average filter or no filter, depending upon the desired rate of convergence of the offset terms. In the case of the cross (X) shaped filter, signals from the registers are sampled and selected by the set of multiplexers and registered at the input of the second multiplexer. The comparator arrangement compares the output signals from the set of multiplexers to determine the median value of all signals in the filter. The median value of the compared signals references the lookup table which provides a selection signal to the second multiplexer, which in turn selects a registered signal as the median value output signal of the selected filter.

The difference between the median value output signal and the value of the central pixel of the filter is determined by the antimedian calculator, which comprises a subtraction circuit that determines the difference between the two signals.

Output signals from the cross (X) and plus (+) shaped filters and comparator arrangement comprise sign information. In the case of the cross (X) and plus (+) shaped filters, the output signal indicates the difference between the signal value for the detector element being compensated, namely the central pixel in the window, and the median of the signals comprising the cross (X) or plus (+) filter, respectively. In the case of the normalization filter, its output signal indicates whether the value of each individual detector signal is equal to, greater than or less than the value of the preset intensity level. This information provides a baseline for determining the rate of convergence of the filtering function performed by the processor. Given the sign and rate information, the processor increments or decrements, as the case may be, nonuniformity compensation terms stored in an offset term memory, which terms are combined with the input video signals during the subsequent video field.

By appropriate selection of the particular filter during any video field, and the particular rate of convergence by which the offset terms are adjusted, controlled adjustment of the compensation terms stored in the offset term memory is achieved. By filtering and processing the video data as described above and controlling the rate of convergence, the present invention achieves nonuniformity compensation of the detectors of the array utilizing only the scene information, requires no calibration, is independent of scene temperature, and the compensation does not require the line of sight of the array to move off of a target within the field of view. By processing the detector output signals in this manner, nonuniformity compensation of the detector elements is achieved such that each detector element appears to respond to received energy in an identical manner.

Methods of generating compensation terms which compensate for nonuniformities between detector elements in a detector array are also provided. One method comprises the following steps. The first step involves selectively processing output signals derived from the detector elements by means of an antimedian cross (X) shaped filter to determine the difference between the value of the central signal of the filter and the median value of all signals comprising the filter. The second step comprises selectively processing output signals derived from the detector elements by means of an antimedian plus (+) shaped filter to determine the difference between the value of the central signal of the filter and the median value of all signals comprising the filter. The third step comprises selectively processing output signals derived from the detector elements by means of a direct comparison to a preset intensity value to determine the difference therebetween. The fourth step comprises adjusting the value of the compensation term associated with the detector element corresponding to the central signal by a predetermined amount in response to a selected computation performed in one of the prior steps to increase or decrease the value of the compensation term to bias the term toward the preset intensity level. The above steps are then repeated for each detector element in the array to compensate each detector element for nonuniformities between detector elements such that each detector element appears to respond to received energy in an identical manner.

More particularly, the step of processing output signals from the detector elements by means of the antimedian cross (X) shaped filter comprises the steps of determining the median of detector signals comprising the cross (X) shaped filter, and comparing the median to the value of the central element in the filter. If the value of the central element is unequal to the median, then the antimedian of the central element is determined. Then the antimedian is compared to zero, and the central value is incremented by a predetermined amount if the antimedian value is greater than zero and decremented by a predetermined amount if the antimedian value is less than zero. Each of these steps are then repeated for each element in the detector array.

The step of processing output signals from the detector elements by means of an antimedian plus (+) shaped filter comprises substantially the same steps as those described above for the cross (X) shaped filter.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
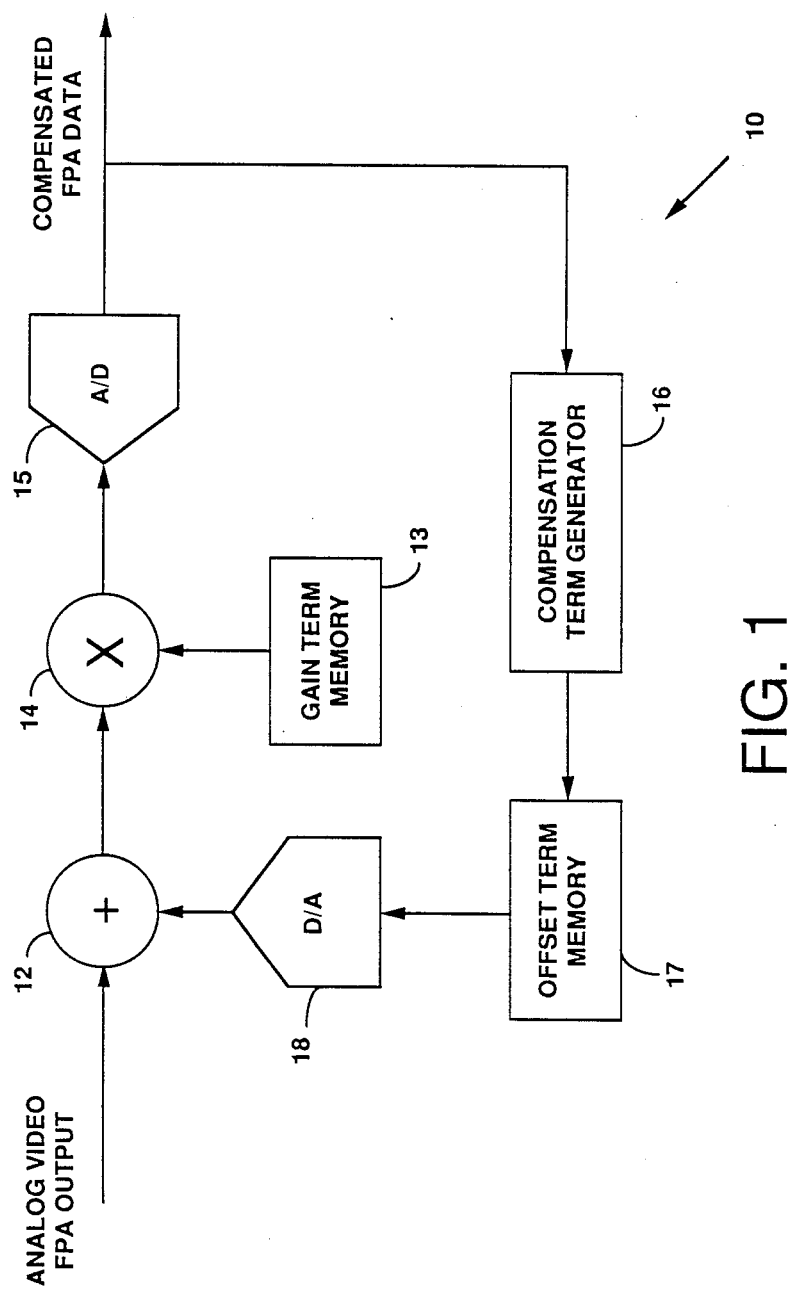
FIG. 1 is a block diagram of a system which implements nonuniformity compensation in accordance with the principles of the present invention.

Referring to FIG. 1, a block diagram of a system 10 which implements nonuniformity compensation in accordance with the principles of the present invention is shown. The system 10 is part of an infrared imaging system employing a staring focal plane array (FPA) of detector elements, for example. Analog output signals from the detector array are provided as analog input signals to the circuitry shown in FIG. 1 and in particular to a summing circuit 12 which has an output that is coupled to a multiplier 14. The multiplier 14 combines the output signals with gain compensation values stored in a gain term memory 13 coupled to a second input of the multiplier 14. Output signals from the multiplier 14 are coupled to an analog to digital converter 15 which provides digitized output signals from this portion of the system 10. The digitized output signals are coupled to a compensation term generator 16 which implements nonuniformity compensation in accordance with the principles of the present invention. Nonuniformity compensation terms provided by the compensation term generator 16 are stored in an offset term memory 17, which stored terms are coupled by way of a digital to analog converter 18 to a second input of the summing circuit 12. The summing circuit 12 combine the offset terms with the output signals from the detector elements in a well-known manner to provide compensated detector output signals.

Figure 2:
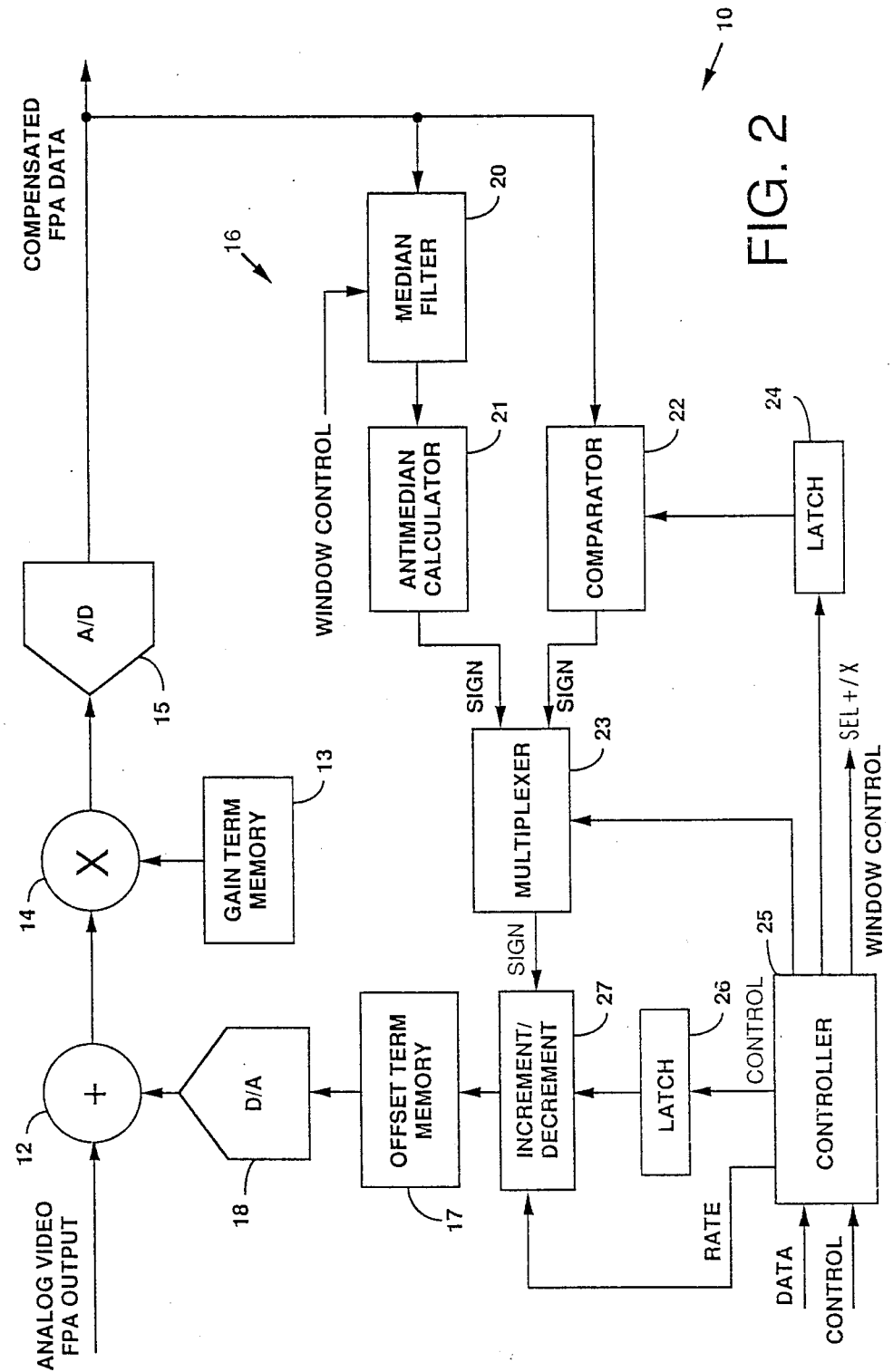
FIG. 2 is a detailed diagram illustrating the system of FIG. 1 and highlighting the nonuniformity compensation circuit of the present invention.

FIG. 2 illustrates the system of FIG. 1 including a detailed embodiment of the compensation term generator 16 of the present invention. The compensation term generator 16 includes a median filter 20, which incorporates the cross (X) shaped and plus (+) shaped filters, and an antimedian calculator 21 which computes the antimedian using the output of the median filter 20.

A comparator 22, which implements the normalization filter of the present invention, compares each detector's signal value to a preset level indicative of the anticipated scene intensity level supplied by the operator of the system. This is accomplished under control of a controller 25 utilizing a latch 24, which provides the preset value. The comparator 22 provides sign information to one input of a multiplexer 23, which information indicates that the value of the comparison is positive or negative with reference to the preset level provided by the controller 25.

The output of the antimedian calculator 21 is coupled to the second input of the multiplexer 23 and the output of the multiplexer 23 is coupled to an increment/decrement logic circuit 27. The multiplexer 23 is employed to select between the two inputs to control which filter is employed to control the convergence of the offset terms. The rate of convergence of the filtering function relative to the preset level is determined by the controller 25, which selects the number of bits by which the offset terms are adjusted. Control signals are also coupled by way of a second latch to the increment/decrement logic circuit 27 along with rate information from the controller 25. Although not shown, the rate information is also coupled from the antimedian calculator 21 to the controller 25 so that the controller can monitor the rate of convergence of the compensation terms. The increment/decrement logic circuit 27 increments or decrements the value of the offset term stored in the offset term memory 17 in accordance with the sign information provided by the multiplexer 23, and the rate information provided by the controller 25.

Figure 3:
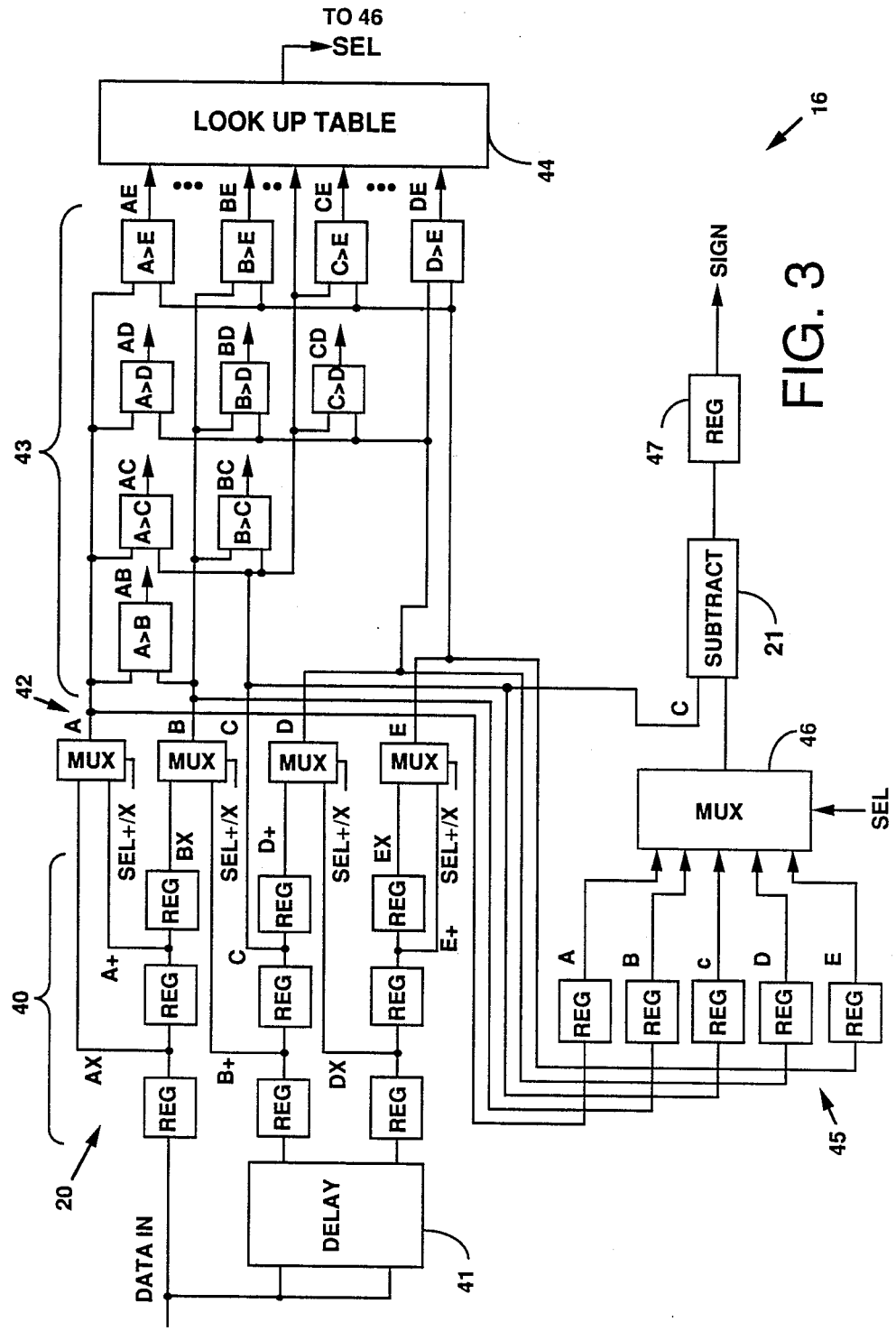
FIG. 3 is a detailed diagram illustrating the median filter and antimedian calculator employed in the nonuniformity compensation circuit of FIG. 2.

The median filter 20 and antimedian calculator 21 are detailed in FIG. 3. The median filter 20 comprises a 3×3 matrix of nine registers 40 with the second and third rows of the matrix each having a delay 41 interposed prior to the first register of each row. The outputs of the registers 40 are selectively coupled to four two input multiplexers 42 whose outputs are coupled to a cascaded set of comparators 43 which generate ten output values, identified as AB, AC, and so on. Outputs from the multiplexers 42 are also coupled to a second set of registers 45 whose outputs are coupled to a five input multiplexer 46. Outputs from the cascaded set of comparators 43 are coupled to lookup table circuitry 44 which provides a selection output signal (SEL) that is coupled to the five input multiplexer 46. The output of the five input multiplexer 46 is coupled to one input of the antimedian calculator 21, while the central value (C) from the matrix of registers 40 is coupled to the other input thereof. The antimedian calculator 21 comprises a substration circuit which substracts the median value from the value of central pixel of the selected filter and logic which determines the sign of the computation, that is, whether the median is zero, greater than the value of central pixel, or less than the value of central pixel. The sign and antimedian values are coupled out of the compensation term generator 16 by way of an output register 47.

In operation, and with reference to the matrix of registers 40 shown in FIG. 3, digital video samples are taken from each of the registers. These samples are designated as AX (A cross) from the register at row 1, column 1, A+(A plus) from the register at row 1, column 2, BX from the register at row 1, column 3, B+ from the register at row 2, column 1, C from the register at row 2, column 2, D+ from the register at row 2, column 3, DX from the register at row 3, column 1, E+ from the register at row 3, column 2, and EX from the register at row 3, column 3. Each of these signals are coupled to their respective multiplexers 42 and selection inputs are provided from the controller 25 which is identified in FIG. 2 as SEL +/X.

The outputs from the multiplexers 42 are coupled by way of the second set of registers 45 to the five input multiplexer 46. The select output signal (SEL) from the lookup table selects the appropriate signal from the five inputs to the multiplexer 46 as an input to the antimedian calculator 21. The other input of the antimedian calculator 21 is the central value of the selected filter. The antimedian calculator 21 provides an output signal comprising the sign of the antimedian value.

With reference to FIG. 2, based upon the sign information from the filters and the rate information provided by the controller 25, the increment/decrement logic circuit 27 appropriately increments or decrements the value of the offset term and stores it in the nonuniformity offset term memory 17. Each pixel in the video field is appropriately sampled by the cross (X) and plus (+) shaped filters while the average of the scale intensity is compared to the preset level by means of the comparator 22. The controller selects the appropriate filter/comparator output by means of the multiplexer 23 to increment or decrement the offset term memory 17. The updated offset terms are combined to the subsequent processed video data during the next video field.

The 3×3 antimedian filter determines the median/antimedian from two spatial configurations ("+" or plus and "X" or cross). The plus/cross configurations are selected by means of a window control line (SEL +/X) provided by the controller 25. The median is generated by sorting the five elements in the 3×3 array. The antimedian is generated by subtracting the center element of the array from the median. Three sets of three cascaded registers 40 form the 3×3 matrix array for pipelining the video and the delayed video read from the delay 41. The register outputs are multiplexed to select the plus/cross configuration. The multiplexed outputs are designated as A, B, C, D, and E, where C is the center element of the 3×3 array.

Ten simultaneous comparisons are performed for all combinations of the five elements. The comparison outputs are fed into the lookup table 44 to generate the select (SEL) control signal that selects the median. The five elements (A, B, C, D and E) are fed into the five input multiplexer 46 with the select (SEL) control signal determining which element is the median. The antimedian generated by the antimedian calculator 21 is registered in the output register 47 and passed to the increment/decrement logic circuit 27.

Figure 4:
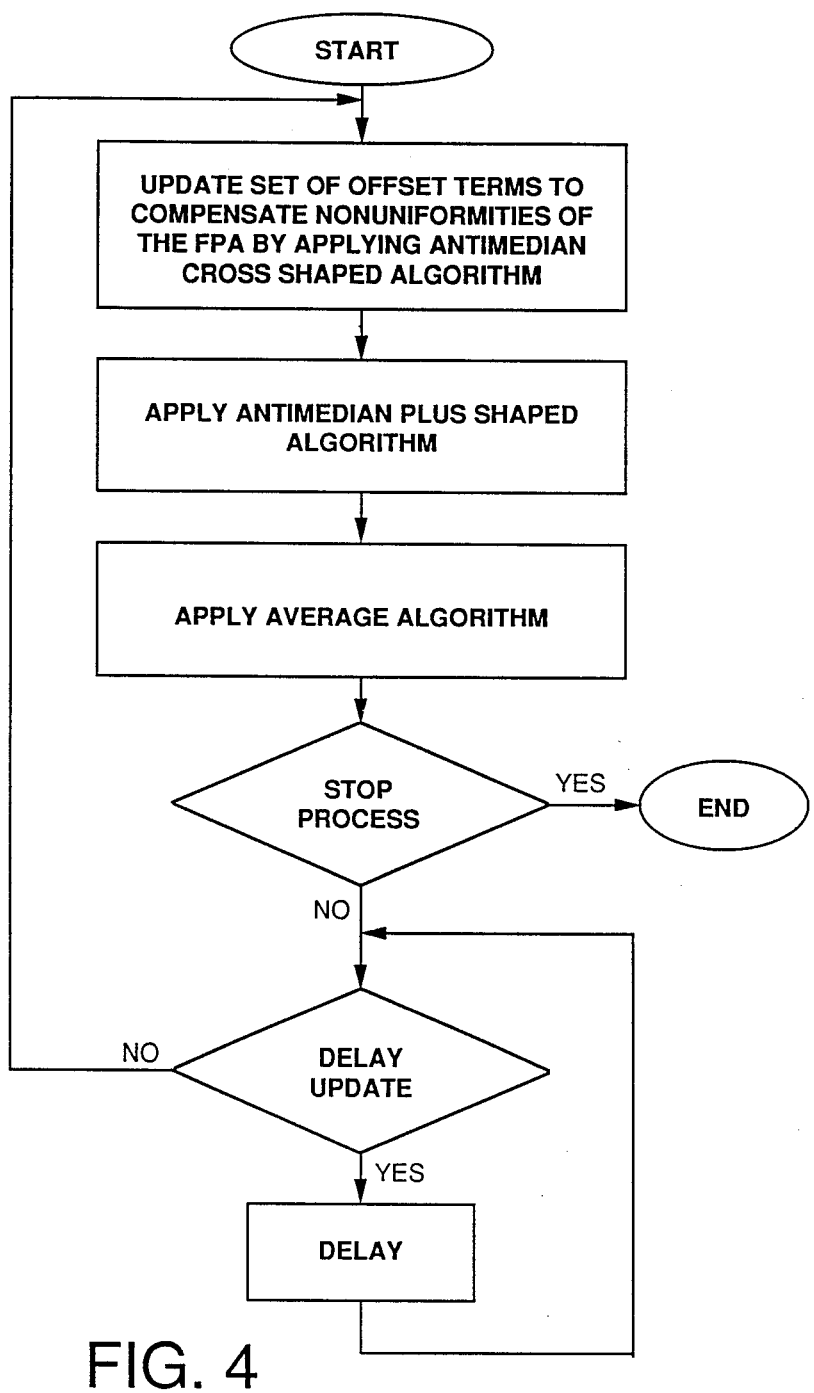
FIG. 4 is a top level process flow chart illustrating the basic method implementing the nonuniformity compensation technique of the present invention.

The algorithms implemented in the present invention and the median and antimedian filters thereof will now be described. FIG. 4 is a top level process flow chart illustrating the basic method employed in accomplishing nonuniformity compensation in accordance with the principles of the present invention. The flow is such that an antimedian cross (X) shaped filter algorithm is employed to filter the data, then an antimedian plus (+) shaped filter is employed to filter the data and finally an average algorithm is employed to filter the data. The outputs of these three filters are performed for each video signal in the data stream from the detector array and offset terms are generated in response to a selected one of the filter outputs and stored in a memory from which they are combined with subsequent video data to compensate the signals.

Figure 5:
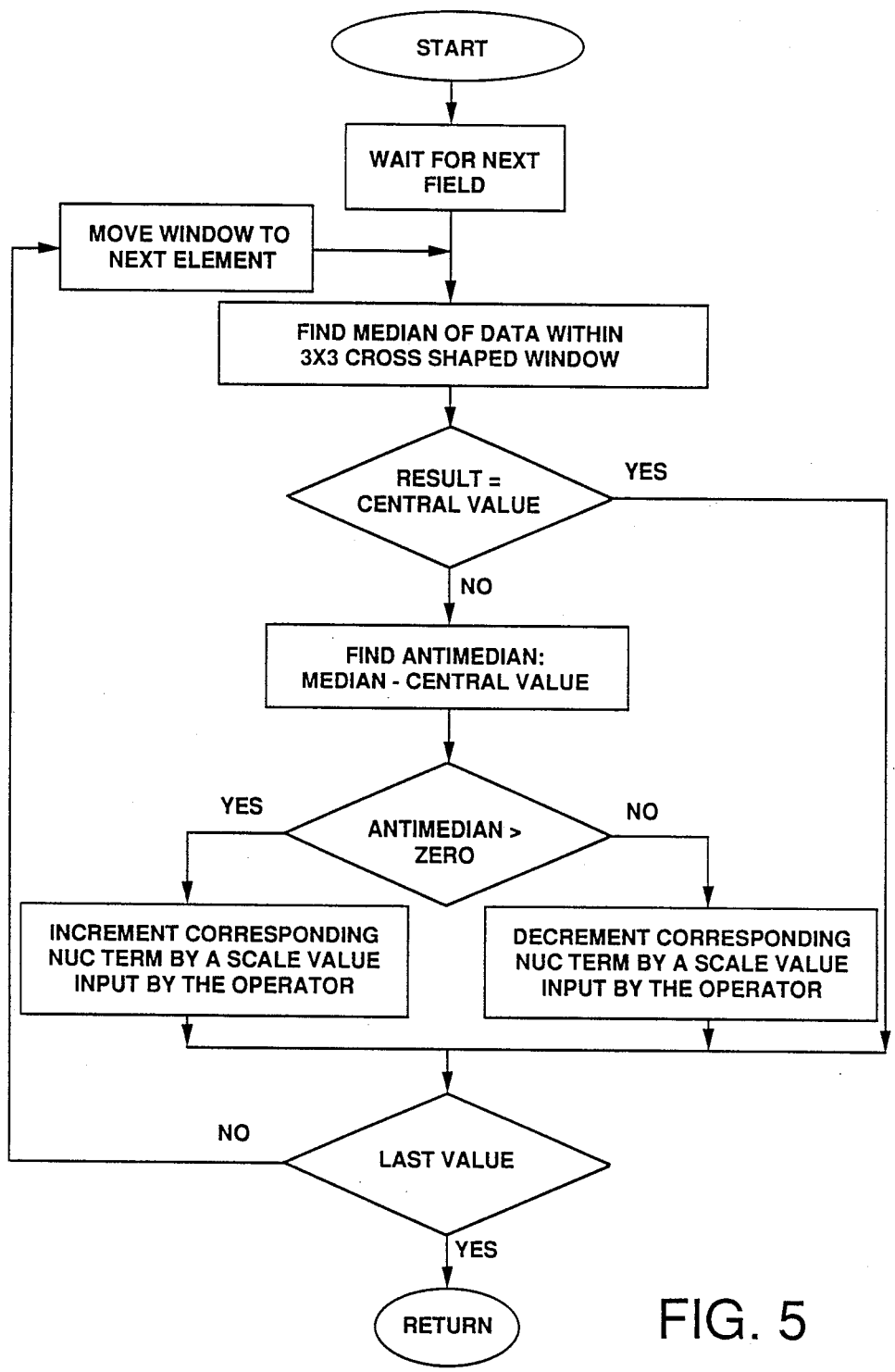
FIG. 5 is a process flow chart for the cross (X) shaped filter employed in the antimedian filter of the present invention.

FIG. 5 is a process flow chart for the cross (X) shaped filter employed in the present invention. The cross (X) shaped filter algorithm comprises finding the median of the detector signals by means of a cross (X) shaped median filter. The result of the median computation is compared to the central value of the filter, which signal corresponds to the detector element being compensated. If the central value and the median are equal the process moves to the next element for computation. If the values are not equal, the antimedian is computed. The antimedian is found by subtracting the median from the central value. The value of the antimedian is then compared to zero. If the antimedian is greater than zero, the corresponding nonuniformity term is incremented by a predetermined scale value. If the antimedian is less than zero, the corresponding nonuniformity term is decremented by a predetermined scale value. The process is repeated for each signal in the video stream.

Figure 6:
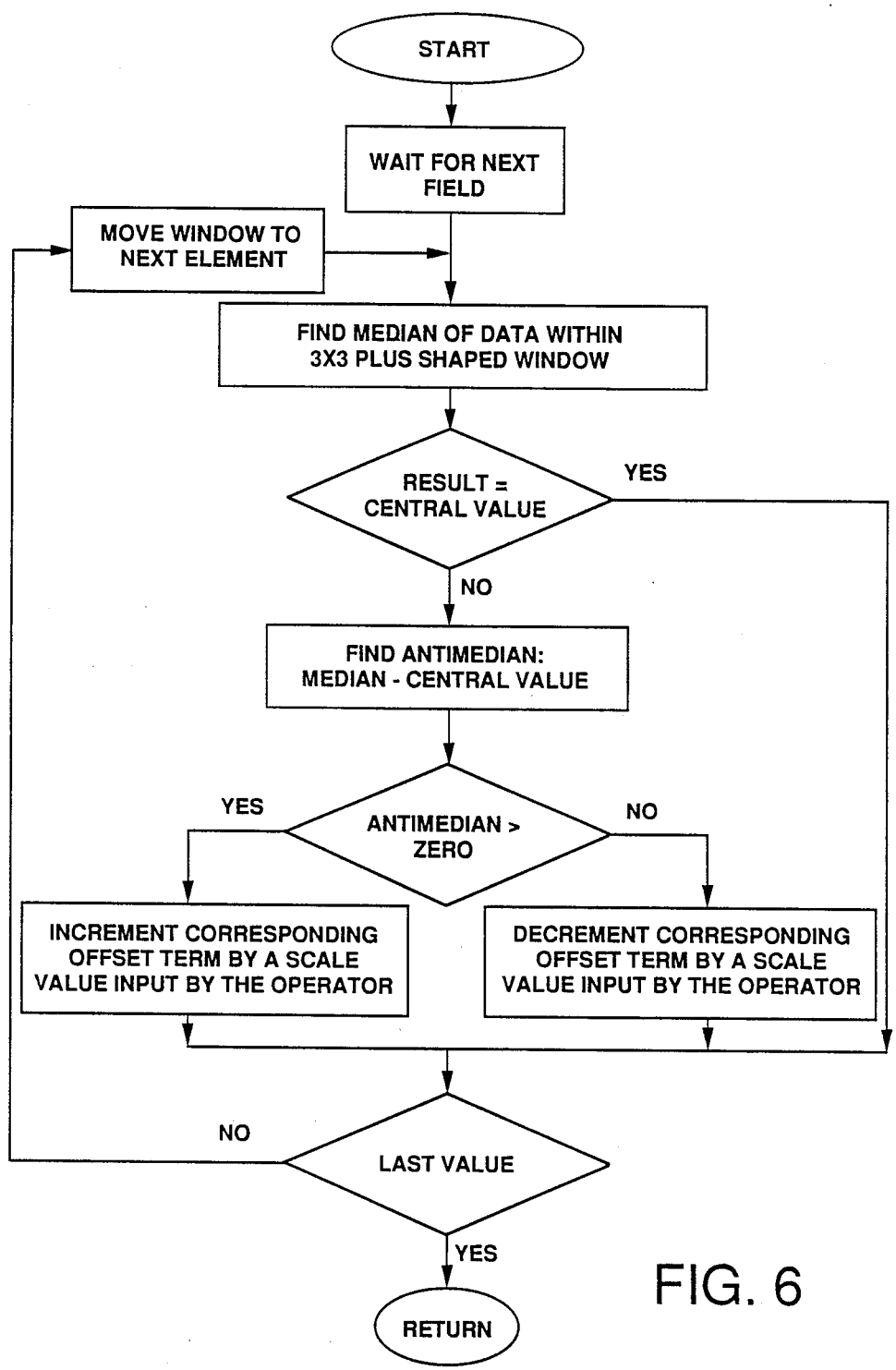
FIG. 6 is a process flow chart for the plus (+) shaped filter employed in the antimedian filter of the present invention.

FIG. 6 is a process flow chart for the plus (+) shaped filter employed in the present invention. This flow chart is substantially identical to that of the cross (X) shaped filter, except for the substitution of the plus (+) shaped filter for the cross (X) shaped filter.

Figure 7:
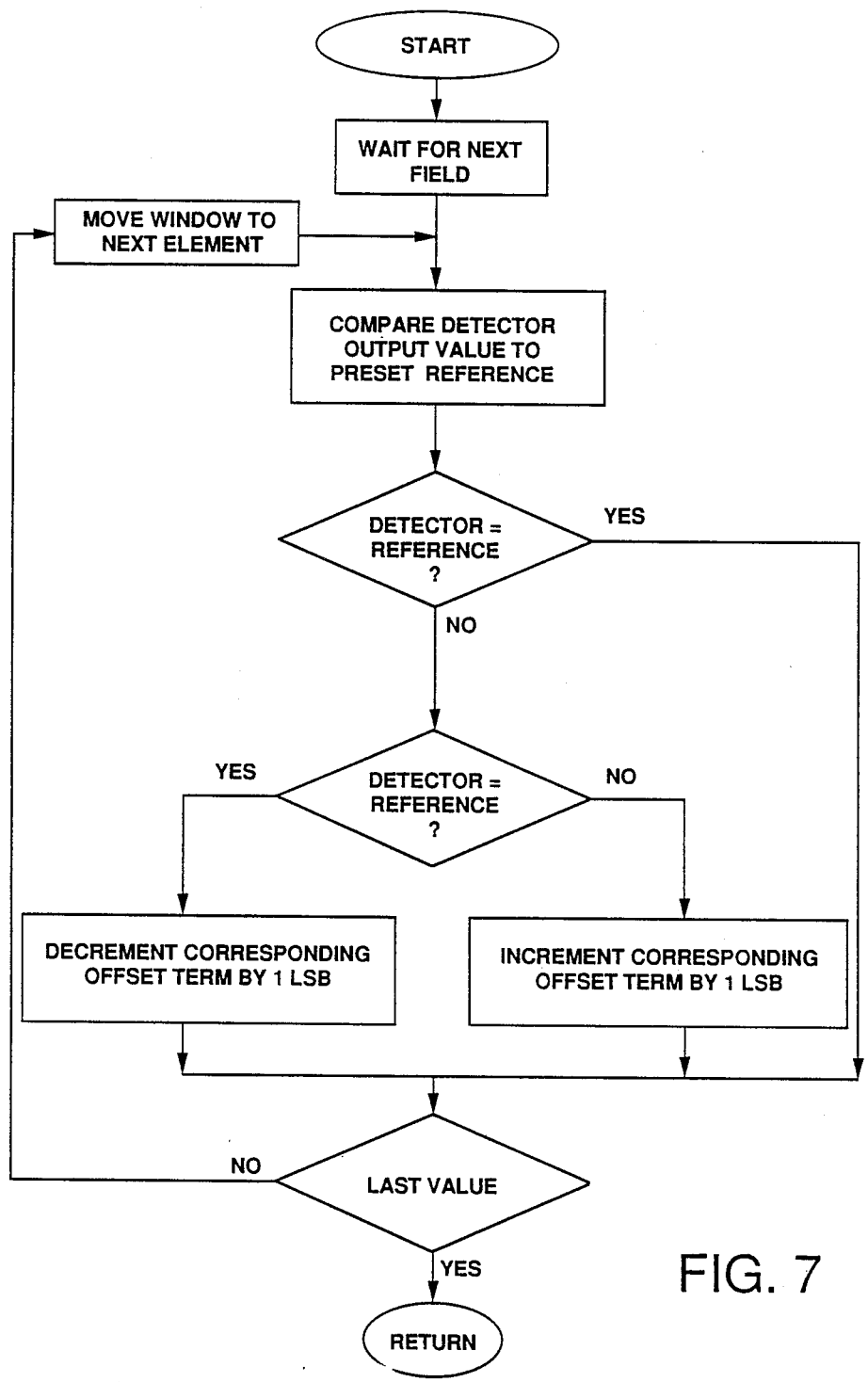
FIG. 7 is a process flow chart for the normalization filter employed in the present invention.

FIG. 7 is a process flow chart for the normalization filter employed in the present invention. The normalization filter compares the detector output value, represented by the center pixel, to a preset value provided by the operator. If the detector output value equals the preset value, nothing is changed and a new element is obtained for evaluation. If the detector output is less than the preset value, the corresponding nonuniformity term is incremented by a predetermined value. If the detector output is greater than the preset value, the corresponding nonuniformity term is decremented by a predetermined value. Consequently, this process forces the value of the compensating terms to a value such that the elements are adjusted toward the preset value. The preset value is generally selected to be close to or equal to the average for the scene. Hence the compensating terms are adjusted towards the scene "average".

Thus, there has been described a new and improved scene based nonuniformity compensation circuit and method of processing video data to generate compensation terms which implements scene based nonuniformity compensation of the detector elements of an infrared detector array, and in particular a staring infrared detector array.

It is to be understood that the above-described embodiments are merely illustrative of some of the many specific embodiments which represent applications of the principles of the present invention. Clearly, numerous and other arrangements can be readily devised by those skilled in the art without departing from the scope of the invention. In particular, any video data stream may be compensated using the present invention, and as such the present invention is not limited to use only with infrared imaging systems, and the like, and may also be employed with scanning imaging systems, for example. Also, the present invention in not limited to the use of only cross (X) and plus (+) shaped filters, or 3×3 filter dimensions, for that matter. These filter shapes and sizes were chosen to permit an efficient implementation of the present invention. In addition, the sequence of filter operations is not a rigid one. The filters may process the video data in any order as may be determined by operational and design considerations. Furthermore, both the cross (X) and plus (+) shaped filters may not be required in all situations. These two filter shapes were chosen since they efficiently filtered the video data to compensate for a broad range of input data patterns. Furthermore, the incrementing and decrementing of compensation values need not be made using only sign information. Other criteria may be employed to increment and decrement the rate of convergence of the filters such as on the absolute magnitude of the antimedian, for example.

What is claimed is:

1. A method of processing signals derived from an array of detector elements to compensate for nonuniformities between detector elements such that each detector element appears to respond to received energy in an identical manner, said method comprising the steps of:
    selectively processing output signals derived from the detector elements by means of an antimedian cross (X) shaped filter to determine the difference between the value of the central signal in the cross (X) shaped filter and the median value of all signals comprising the filter and for providing a first output signal indicative of the difference;
    selectively processing output signals derived from the detector elements by means of an antimedian plus (+) shaped filter to determine the difference between the value of the central signal in the plus (+) shaped filter and the median value of all signals comprising the filter and for providing a second output signal indicative of the difference;
    selectively processing output signals derived from the detector elements and comparing each of them to a preset intensity value to determine the difference therebetween and for providing a third output signal indicative of the difference; and
    adjusting the value of the compensation term associated with the detector element corresponding to the central signal by a predetermined amount in response to a selected one of the output signals to adjust the value of the compensation term to bias the detector output toward a uniform response.

2. A method of processing signals derived from an staring array of detector elements to compensate for nonuniformities between detector elements such that each detector element appears to respond to received energy in an identical manner, said method comprising the steps of:

selectively processing output signals derived from the detector elements of the staring array by means of an antimedian cross (X) shaped filter to determine the difference between the value of the central signal in the cross (X) shaped filter and the median value of all signals comprising the filter and for providing a first output signal indicative of the difference;

selectively processing output signals derived from the detector elements of the staring array by means of an antimedian plus (+) shaped filter to determine the difference between the value of the central signal in the plus (+) shaped filter and the median value of all signals comprising the filter and for providing a second output signal indicative of the difference;

selectively processing the signals derived from each of the detector elements of the staring array and comparing them to a preset intensity value to determine the difference therebetween and providing a third output signal indicative of the difference; and adjusting the value of the compensation term associated with the detector element corresponding to the central signal by a predetermined amount in response to a selected one of the output signals to adjust the value of the compensation term to bias the detector output toward a uniform response.

3. The method of claim 2 wherein the step of selectively processing output signals from the detector elements by means of an antimedian cross (X) shaped filter comprises the steps of:

determining the median of detector signals within a cross (X) shaped window;

comparing the median to the value of the central element in the window;

determining the antimedian of the central element in the window if the value of the central element is unequal to the median; and comparing the antimedian to zero, and incrementing the central value by a predetermined amount if the antimedian value is greater than zero and decrementing the central value by a predetermined amount if the antimedian value is less than zero.

4. The method of claim 2 wherein the step of selectively processing output signals from the detector elements by means of an antimedian plus (+) shaped filter comprises the steps of:

determining the median of detector signals within a plus (+) shaped window;

comparing the median to the value of the central element in the window;

determining the antimedian of the central element in the window if the value of the central element is unequal to the median; and comparing the antimedian to zero, and incrementing the central value by a predetermined amount if the antimedian value is greater than zero and decrementing the central value by a predetermined amount if the antimedian value is less than zero.

5. A signal processor for use with an imaging system comprising an array of detector elements, which implements nonuniformity compensation of the detector elements, said processor comprising:

filter means for sampling a subset of signals derived from the array, which subset corresponds to a plurality of detector elements in the array including a selected detector element which is to be compensated, and for selectively processing the subset of signals by means of an antimedian cross (X) shaped filter and an antimedian plus (+) shaped filter, and for providing an output signal from the selected filter which is indicative of the difference between the signal derived from the selected detector element and the median value of the signals processed by the selected filter, and for providing an output signal from the selected filter which is indicative of the sign of the filter computation indicating whether the selected signal is equal to, greater than or less than the median;

comparator means for processing signals from the array and for comparing each of the signal levels to a preset signal level indicative of an anticipated scene intensity level, and for providing an output signal indicative of the sign of the comparison indicating whether the anticipated scene level is equal to, greater than or less than the preset signal level;

selection means coupled to the filter means and the comparator means for selectively choosing an output signal therefrom and for providing an output signal corresponding to the selected signal;

offset memory means coupled to said selection means for storing and subsequently combining offset compensation terms with output signals from the array;

controller means coupled to the comparator means for providing the preset signal level thereto, and coupled to the filter means and comparator means for selecting an output signal from the antimedian cross (X) shaped filter, the antimedian plus (+) shaped filter, or the comparator means, and coupled to the selection means for controlling the selection means to adjust the compensation terms stored in the offset memory means as a function of a predetermined rate of convergence in response to the selected output signal;

whereby nonuniformities in the detector elements of the array are compensated for by adjustment of the compensation terms such that each detector element appears to respond to infrared energy in an identical manner.

6. A signal processor for use with a staring focal plane array infrared imaging system which implements scene based nonuniformity compensation of the detectors comprising the array, said processor comprising:

first filter means for processing signals from the focal plane array by means of an antimedian cross (X) shaped filter and for providing an output signal therefrom which is indicative of the difference between the median of the signals processed thereby and the central signal within the cross (X) shaped filter;

second filter means for processing signals by means of an antimedian plus (+) shaped filter and for providing an output signal therefrom which is indicative of the difference between the median of the signals processed thereby and the central signal within the plus (+) shaped filter;

average filter means for comparing the signal level of each of the signals derived from detectors in the array to a preset signal level, and for providing a third output signal which is indicative of the difference therebetween;

offset memory means for storing and subsequently combining offset compensation terms with processing signals from the focal plane array;

controller means coupled to the first filter means, the second filter means and the average filter means for controlling the selection of the filter means utilized to adjust the offset compensation terms and for processing the output signals provided by the selected filter to adjust the offset compensation terms as a function of the output signal of a selected filter means;

whereby nonuniformities in the detector elements of the array are compensated for such that each detector element appears to respond to infrared energy in an identical manner.

7. A signal processor for use with a focal plane array infrared imaging system which implements scene based nonuniformity compensation of the detectors comprising the array, by determining and adjusting nonuniformity compensation terms stored in an offset term memory and which are combined with output signals from the array, said processor comprising:

register means for sampling a matrix of output signals from the array;

first selection means for selectively sampling a plurality of signals from the matrix in the form of a cross (X) shaped set of signals and a plus (+) shaped set of signals;

comparison means coupled to the first selection means for determining the respective median value of signals comprising the cross (X) shaped set of signals and the plus (+) shaped set of signals, and for providing an output signal which is indicative of the median of the compared signals;

second selection means coupled to the first selection means and the comparison means for responding to the output signal from the comparison means and for selecting the median value of the respective cross (X) shaped set of signals and plus (+) shaped set of signals;

antimedian calculation means coupled to the register means and the second selection means for determining the difference between the median value provided by the second selection means and the central signal of the matrix of signals;

comparator means for comparing the intensity level of each of the signals derived from the detector array to a preset signal value, and for providing an output signal indicative of the sign of the comparison indicating whether the output signal value is equal to, greater than or less than the preset signal level;

controller means coupled to the comparator means for providing the preset signal value thereto, and coupled to the first selection means and comparator means for selecting an output signal from the cross (X) shaped set of signals, the plus (+) shaped set of signals, or the comparator means, which selected signal is employed to adjust the compensation terms, and for controlling adjustment of the compensation terms in response to the selected signal.

* * * * *